(12) United States Patent
Stokes

(10) Patent No.: US 7,775,293 B2
(45) Date of Patent: Aug. 17, 2010

(54) FURROW CLOSER

(76) Inventor: Rick Stokes, Box 136, Moose Jaw, SK (CA) S6H 4N8

( * ) Notice: Subject to any disclaimer, the term of this patent is extended or adjusted under 35 U.S.C. 154(b) by 0 days.

(21) Appl. No.: 12/413,207

(22) Filed: Mar. 27, 2009

(65) Prior Publication Data

US 2009/0200052 A1     Aug. 13, 2009

Related U.S. Application Data

(63) Continuation-in-part of application No. 11/060,256, filed on Feb. 17, 2005, now Pat. No. 7,520,338.

(30) Foreign Application Priority Data

Feb. 17, 2004  (CA) ................................... 2458118

(51) Int. Cl.
    *A01B 5/00*     (2006.01)
(52) U.S. Cl. .......... 172/142; 172/643; 172/707
(58) Field of Classification Search ............. 172/139, 172/142, 144, 149, 156, 175, 176, 179, 193, 172/195, 196, 200, 538, 544, 551, 570, 571, 172/573, 576, 612, 627, 642, 643, 658, 699, 172/705, 707, 711; 111/148, 149, 191, 192, 111/194, 924
    See application file for complete search history.

(56) References Cited

U.S. PATENT DOCUMENTS

| 2,758,531 | A | * | 8/1956 | Siems | 172/142 |
| 2,772,618 | A | * | 12/1956 | Schmidt | 172/193 |
| 3,175,622 | A | * | 3/1965 | Stam | 172/159 |
| 3,227,226 | A | * | 1/1966 | Bayne | 172/705 |
| 3,599,727 | A | * | 8/1971 | Gates | 172/12 |
| 4,423,787 | A | * | 1/1984 | Steinberg | 172/142 |
| 5,027,907 | A | * | 7/1991 | Delyea | 172/707 |

* cited by examiner

*Primary Examiner*—Robert E Pezzuto
*Assistant Examiner*—Jamie L McGowan
(74) *Attorney, Agent, or Firm*—Stites & Harbison, PLLC; David W. Nagle, Jr.

(57) ABSTRACT

A furrow closer apparatus has a bracket extending down from an upper forward portion of an implement shank. Right and left spring arms with soil moving elements at lower ends thereof are attached at top ends thereof to right and left coil springs connected by a cross member. A spring tube extends through the coil springs and through the bracket aperture to attach the spring arms such that a spring arm extends rearward and downward on each side of a shank location. Clips are attached to the spring tube on each side of the bracket aperture and define clip apertures. The cross member extends through the clip apertures, and the clip apertures are larger than the cross member such that the cross member is movable in the clip apertures. Rotatable discs with a twine wrap inhibiting ring can provide the soil moving elements.

18 Claims, 11 Drawing Sheets

FURROW CLOSER

CROSS-REFERENCE TO RELATED APPLICATIONS

The present application is a continuation-in-part of pending U.S. application Ser. No. 11/060,256 entitled "Furrow Closer" and filed on Feb. 17, 2005, an application which itself claims priority to Canadian Patent Application No. 2,458,118 filed on Feb. 17, 2004.

BACKGROUND

This invention is in the field of cultivators and seeders such as are used in agriculture for seeding, fertilizing, and the like by opening furrows in the ground and depositing appropriate agricultural materials in the furrows, and in particular with mechanisms to close the furrows created by such seeders.

Seeders are known in the agricultural industry for planting and fertilizing crops. A typical seeder comprises a frame on wheels carrying a plurality of furrow openers and a distribution system for depositing agricultural materials such as seed, fertilizer, and the like in the furrows. Typically there will also be a packing mechanism as well that will pack the furrows to improve seed to soil contact.

Commonly the furrow opener comprises a ground engaging tool such as a knife, shovel, or the like mounted on a shank that extends downward from the seeder frame, and a tube that delivers agricultural materials into the furrow created by the tool as it moves through the ground. Some of the soil moved by the tool to create the furrow will fall back into the furrow to cover the seed, however typically a significant amount of soil remains in a pair of ridges, one on each side of the furrow. Considerable prior art has been directed to creating furrow closing devices for moving this soil back over the furrow to ensure that the agricultural materials in the furrow are covered, and to level the ground.

U.S. Pat. Nos. 5,782,307 to Forsyth, 5,623,997 to Rawson et al., 5,595,249 to Steinberger et al., 5,333,694 to Roggenbuck et al., 4,485,878 to Uken, and 2,070,509 to Chiles disclose furrow closing devices comprising a pair of discs mounted to a shank and oriented to move soil from a location beside a furrow over on top of the furrow. The discs can be pivotally mounted to the shank and biased downward as disclosed in Forsyth and Rawson et al. to ensure they engage the soil. Alternatively the weight of the pivotally mounted discs can suffice to engage the soil sufficiently for the purpose of moving the required amount of soil, as disclosed in Steinberger et al., and Chiles.

Similarly U.S. Pat. Nos. 2,805,613 to Siems, 3,157,139 to Spindler, 3,175,622 to Stam, 3,227,226 to Bayne, 3,251,423 to McCauley, 3,322,203 to Johnson, 3,536,145 to Clark, and 4,037,545 to Dreyer disclose furrow closing and ground leveling devices comprising various drags, scoops, harrow teeth, and the like that are fixed to the shanks to push soil toward the furrow.

In typical air seeders, one or more hoses run down the back of the shank to direct agricultural materials into the furrow created by the ground engaging tool on the bottom of the shank. The prior art devices generally are mounted on the rear of the shank, and so it is difficult to properly locate the hoses and devices on the rear of the shank.

Furrow closers that move soil with drags do not work well in wet, sticky soil because the soil builds up on the surface of the drag. Harrow teeth do not move sufficient soil to satisfactorily cover the furrow, since such teeth push soil contacted in both directions, rather than moving soil only toward the furrow, as with a drag. Soil does not stick to rotating discs to the same extent, and scrapers can be attached to clean disc surfaces as they rotate. The prior art disc furrow closers are complex and costly, especially those that include a spring to bias the discs.

On farms where cattle are fed on fields, baler twine is often present on land being worked by air seeders and the like. When using ground engaging rotating discs such as are used in the furrow closers described above, such twine commonly wraps around the shaft connecting the discs to the implement. This ball of twine exerts considerable pressure and can cause the disc to stop rotating and can damage bearings. It is common to cut this wrapped twine away with a cutting torch, however it is difficult to prevent damaging the bearings and shaft when cutting twine wrapped tightly against them.

SUMMARY OF THE INVENTION

It is an object of the present invention to provide a furrow closer apparatus that overcomes problems in the prior art. It is a further object of the present invention to provide such a furrow closer apparatus that mounts under the shank and beside the shank, leaving the rear of the shank unobstructed. It is a further object of the present invention to provide such a furrow closer apparatus that biases the soil moving elements of the closer to a neutral operating position so that excessive soil penetration is avoided, and yet movement away from the operating position is resisted by a bias force.

The present invention provides, in a first embodiment, a furrow closer apparatus for attachment to a shank of a ground working implement, the shank extending rearward and downward from an implement frame member to a lower shank end adapted for attachment to a ground engaging tool. The apparatus comprises a bracket adapted for attachment to the implement such that the bracket extends down from an upper forward portion of the shank. A bracket aperture is defined by a lower end of the bracket, the bracket aperture oriented substantially horizontally and perpendicular to an operating travel direction of the implement. Right and left spring arms are attached at top ends thereof to right and left coil springs, the right and left coil springs connected by a cross member. Right and left soil moving elements are attached to lower ends of the respective right and left spring arms. A spring tube extends through the coil springs and through the bracket aperture to attach the spring arms to the bracket such that a spring arm extends rearward and downward from the lower end of the bracket on each side of a shank location. Right and left clips are attached to the spring tube on corresponding right and left sides of the bracket aperture such that the right and left clips define right and left clip apertures. The cross member extends through the right and left clip apertures, and the clip apertures are larger than the cross member such that the cross member is movable in the clip apertures.

The present invention provides, in a second embodiment, a ground working implement comprising an implement frame adapted for movement along the ground in an operating travel direction, and a curved shank extending rearward and then downward from an implement frame member to a lower shank end, and a ground engaging tool attached to the lower shank end and operative to create a furrow in the soil when the implement is moved along the ground. A bracket is attached to the implement such that the bracket extends down from an upper forward portion of the shank, and a bracket aperture is defined by a lower end of the bracket, the bracket aperture oriented substantially horizontally and perpendicular to the operating travel direction. Right and left spring arms are attached at top ends thereof to right and left coil springs and the right and left coil springs are connected by a cross member. Right and left soil moving elements attached to lower ends of the respective right and left spring arms. A spring tube extends through the coil springs and through the bracket aperture to attach the spring arms to the bracket such that a spring arm extends rearward and downward from the lower end of the bracket on each side of a shank location. Right and left clips are attached to the spring tube on corresponding right and left sides of the bracket aperture such that the right and left clips define right and left clip apertures. The cross member extends through the right and left clip apertures, and the clip apertures are larger than the cross member such that the cross member is movable in the clip apertures.

The apparatus of the invention provides an effective and economical furrow closer that is conveniently mounted on a conventional cultivator shank, and leaves the rear of the shank unobstructed to facilitate attachment of seed boots, seed tubes and the like for use in air seeding applications, and the clips holding the cross member loosely reduce the occurrence of parts becoming loose.

The present invention further provides a rotating disc apparatus for attachment to a ground working implement. The apparatus comprises an arm adapted for attachment to the implement at an upper portion thereof, a mounting plate fixed to a lower portion of the arm, and a shaft extending substantially perpendicular to a surface of the mounting plate. A hub is rotatably attached to the shaft, and a disc is attached to the hub by a substantially circular pattern of bolts. The bolts extend from the disc and hub toward the mounting plate substantially parallel to the shaft. A ring is positioned between the disc and the mounting plate, the ring defining a ring aperture having a diameter larger than an outside diameter of the circular pattern of bolts such that the bolts extend into the ring aperture and such that the ring rotates around the circular pattern of bolts. The ring has a width greater than a distance from ends of the bolts to the mounting plate such that the ring is prevented from passing between the ends of the bolts and the mounting plate.

In operation contact of twine on the ground with the bolts is reduced and thus the occurrence of twine wrapping around the shaft is also reduced.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
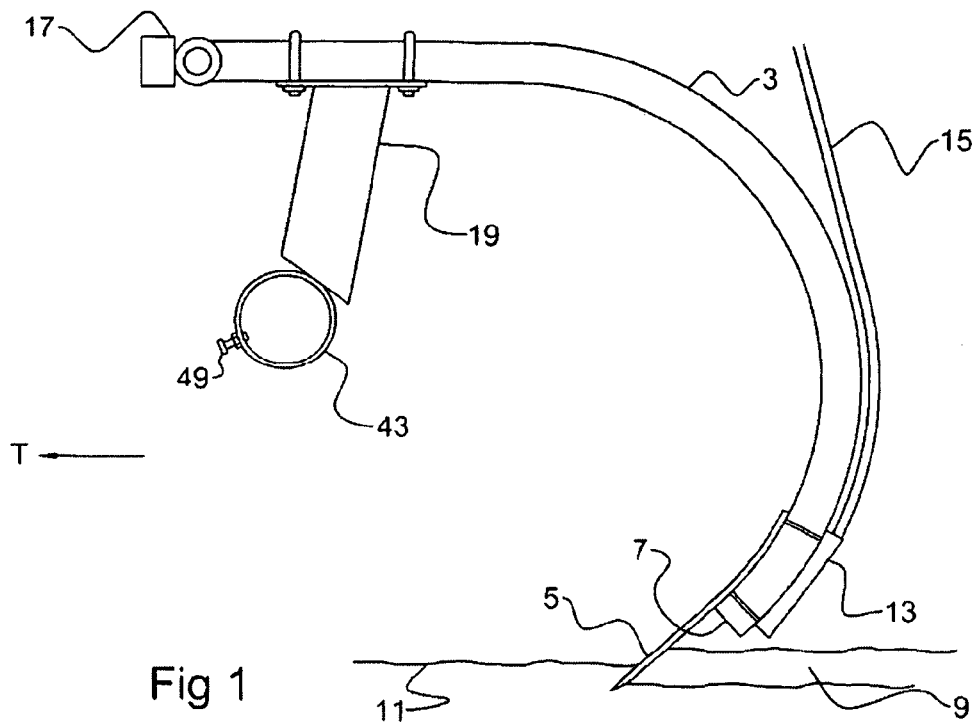
FIG. 1 is a side view of a shank and ground engaging tool with a bracket of the invention attached.
Figure 2:
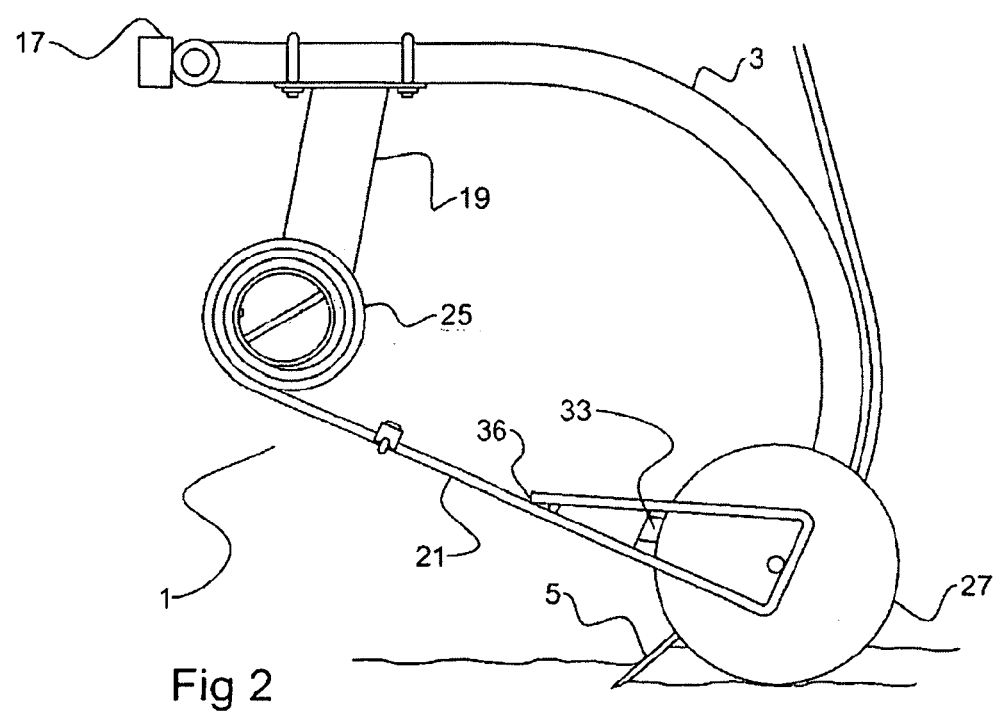
FIG. 2 is a side view of the shank and bracket of FIG. 1 with coil springs, spring arms, and discs installed.

FIGS. 1-4 illustrate a furrow closer apparatus 1 of the invention for attachment to a shank 3 of a ground working implement adapted for movement along the ground in an operating travel direction T. FIGS. 1 and 2 illustrate a ground engaging tool 5 attached to the lower shank end 7 of the shank 3. The ground engaging tool 5 is operative to create a furrow 9 in the soil 11 when the implement is moved along the ground. The illustrated shank 3 also has a seed boot 13 attached to the rear side of the lower shank end 7 and a seed tube 15 following generally along the rear side of the shank 3 to the seed boot 13 for carrying seed, fertilizer, and the like to the boot 13 to be directed into the furrow 9. Such a configuration is typical of an air seeder.

The shank 3 is conventionally attached to an implement frame member 17 and is illustrated as extending in a curve rearward and then downward from the implement frame member 17 to the lower shank end 7. This type of shank is commonly used in cultivators, air seeders and the like.

Figure 3:
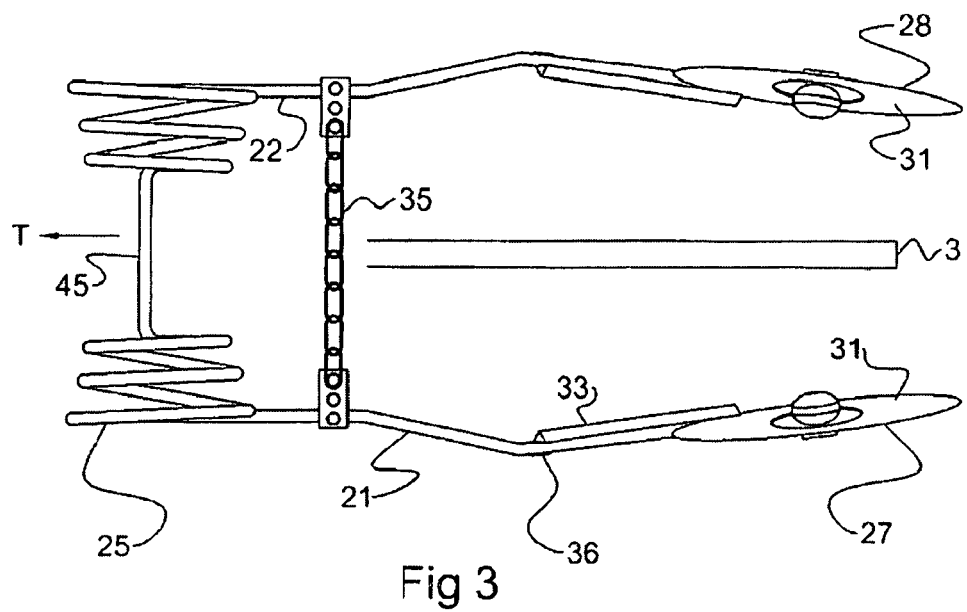
FIG. 3 is a top view of the coil springs, spring arms, and discs of FIG. 2.
Figure 4:
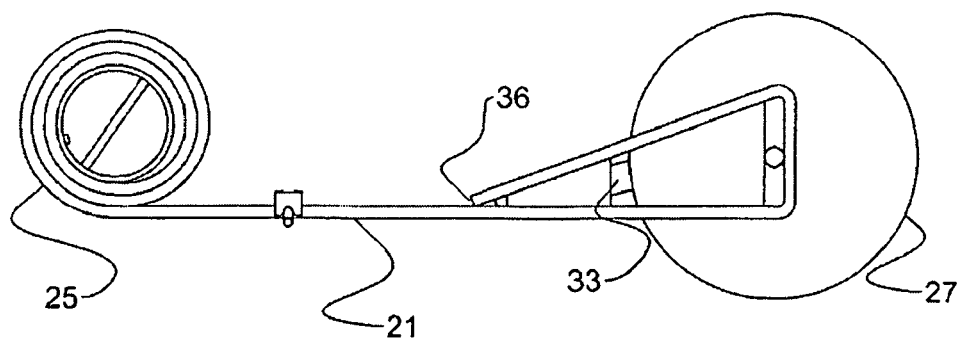
FIG. 4 is a side view of the coil springs, spring arms, and discs of FIG. 2.

A bracket 19 is attached to the shank 3 such that the bracket 19 extends down from an upper forward portion of the shank 3. First and second spring arms 21, 22, as seen in FIG. 3, are attached to a lower end of the bracket 19 such that a spring arm 21, 22 extends rearward and downward from the lower end of the bracket 19 on each side of and below the shank 3. The spring arms 21, 22 are biased to a neutral position such that movement of the spring arms 21, 22 away from the neutral position is resisted by a bias force exerted by coil springs 25.

First and second soil moving elements, illustrated as discs 27, 28 are attached to lower ends of the respective first and second spring arms 21, 22 such that the discs 27, 28 are in proximity to the lower shank end 7 when the spring arms 21, 22 are in the neutral position and such that leading faces 31 of the discs 27, 28 are oriented at opposed angles to the operating travel direction T such that forward portions of the leading faces 31 are farther apart than rearward portions of the leading faces 31. Thus soil contacted by each leading face 31 is moved toward the shank 3 rearward of the shank 3 and over the furrow 9 created by the ground engaging tool 5.

Scrapers 33 are oriented to clean soil from the leading faces 31 of the discs 27, 28. In the illustrated embodiment, the distal ends of arms 21, 22 are bent and welded together at joint 36 and the scrapers 33 comprise a plate or angle iron welded to the joint 36. In addition to cleaning the discs, the scraper thus also reinforces the joint 36.

In the illustrated embodiment, the discs 27, 28 are also oriented at an angle to the vertical such that upper portions of the leading faces 31 are farther apart than lower portions of the leading faces 31. Thus soil contacted by each leading face 31 is moved somewhat upward as well as toward the shank 3. The incline of the discs 27, 28 off the vertical and off the operating travel direction T also causes the discs 27, 28 to draw themselves into the soil rather than simply rolling on top.

The illustrated shank 3 is typical of the shape of shanks used on various brands of agricultural implements, however the dimensions and angles of curvature vary from one model to another. The configuration of the bracket 19 will be modified to suit the particular shank 3 on which the apparatus will be mounted so that the spring arms 21, 22 extend rearward and downward at a under the shank 3 and on each side of the shank.

With such a configuration the discs 27, 28 will readily ride up and over obstructions. Generally the bracket 19 will be attached to the shank 3, however with some models of implement attachment may be more conveniently made to the implement frame 17 or some other part of the implement such that the bracket tube 43 or like attachment member at the lower end of the bracket 19 is under the upper forward portion of the shank 3.

With the spring arms 21, 22 oriented below and on each side of the shank 3 the rear of the shank 3 is left clear for unobstructed attachment of the seed boot 13 and seed tube 15, as opposed to the prior art furrow closers where the rear of the shank 3 is obstructed.

Figure 2A:
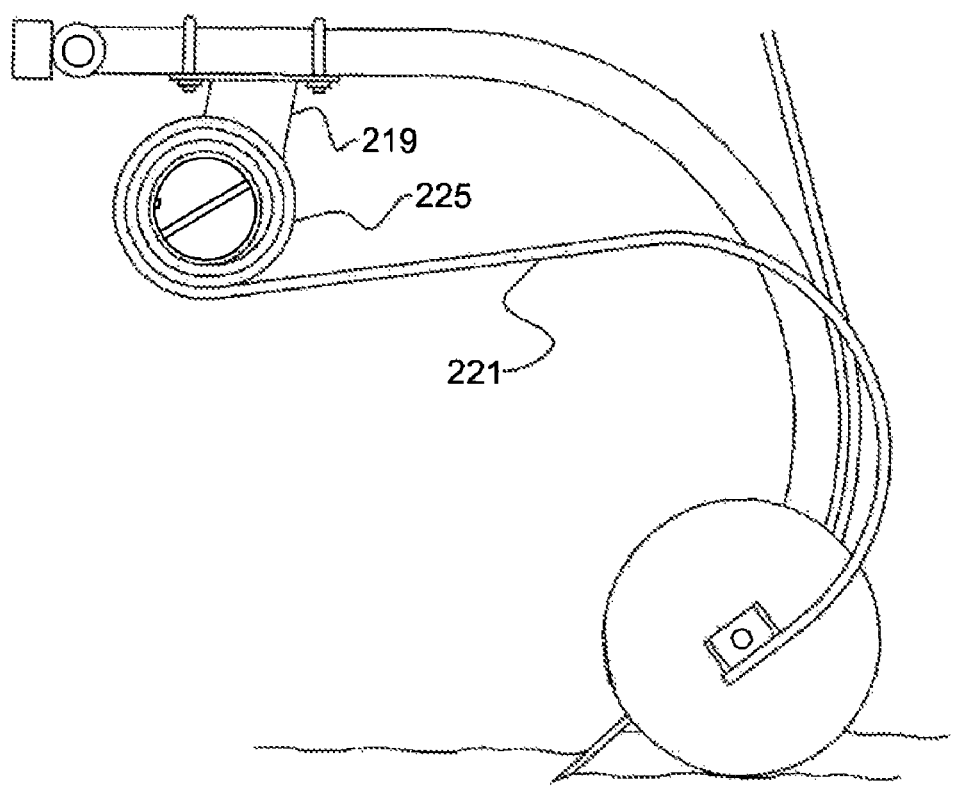
FIG. 2A is a side view showing an alternate shape of the spring arms.

FIG. 2A illustrates an alternate embodiment of the first and second spring arms. The spring arm 221 again extends rearward and downward from the lower end of the bracket 219, however instead of being substantially straight and oriented at an angle as in the embodiment of FIG. 2, it curves rearward and downward as illustrated. The spring arm 221 is again biased to a neutral position such that movement of the spring arm 221 away from the neutral position is resisted by a bias force exerted by coil springs 225.

Figure 7:
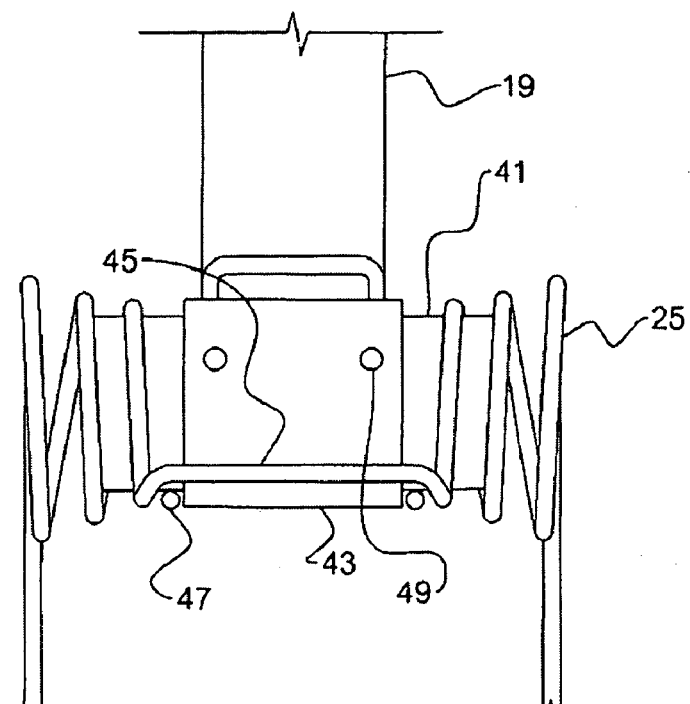
FIG. 7 is a front view of the attachment of the spring arms to the bracket.
Figure 8:
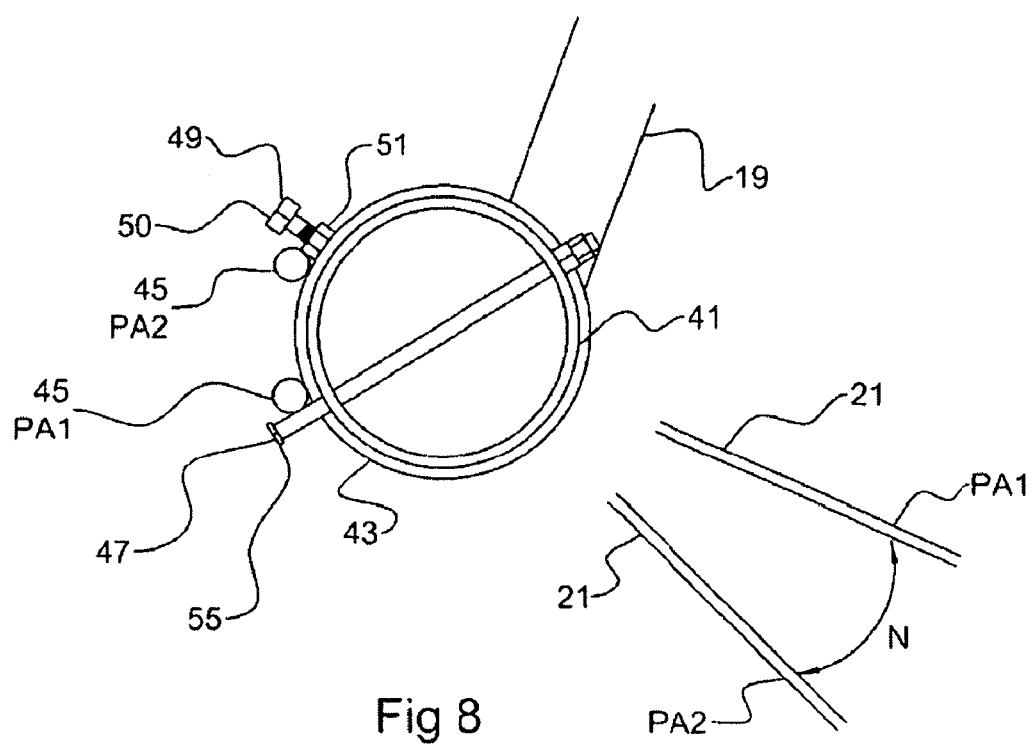
FIG. 8 is a schematic side view showing the spring tube in place in the bracket tube, with upper and lower limits of the neutral vertical range of the spring arms.

As illustrated in FIGS. 7 and 8 the spring arms 21, 22 are attached at top ends thereof to coil springs 25, and are pivotally mounted to the bracket 19 by a spring tube 41 through the coil springs 25 and through a bracket aperture defined by a bracket tube 43 at the lower end of the bracket 19. The coil springs 25 are connected by a cross member 45. The spring arms 21 and 22, coil springs 25, and cross member 45 are configured the same as a conventional paired tine harrow as is known in the art, and such a tine harrow can be conveniently and economically used to provide these elements of the apparatus.

Upper stop 47 and lower stop 49 are oriented to bear against the cross member 45 and define the limits of a neutral vertical range N within which the spring arms 21, 22 can pivot freely with respect to the bracket 19 before the bias force of the coil springs 25 is exerted on the spring arms 21, 22.

In the schematic illustration of FIG. 8 the coil has been deleted so that the relationship between the cross member 45 and stops 47, 49 can be illustrated. The spring arm 21 is shown at the upper limit of its neutral vertical range in position PA1, prevented from further upward free movement by the cross member 45 bearing against the upper stop 47. FIG. 8 also shows the spring arm 21 at the lower limit of its neutral vertical range in position PA2, prevented from further downward free movement by the cross member 45 bearing against the lower stop 49. When the implement is raised for transport, the lower stop 49 prevents the spring arms 21, 22 from falling lower than position PA2 thus maintaining the discs in a raised position so the implement can be transported with the discs above the ground.

Between the upper and lower stops 47, 49 the cross member 45 moves freely and so no bias force is exerted on the spring arms 21, 22 by the coil springs 25. Lateral movement of the spring arms 21, 22 however will be resisted by a bias force exerted by the coil springs 25 when the arms are in the neutral vertical range N.

In the illustrated embodiment of FIG. 8 the upper stop 47 is provided by a bolt 55 through the spring tube 41 adjacent to each end of the bracket tube 43. The lower stops 49 are provided by bolts 50 threaded through the wall of the bracket tube 43 and bearing against the outer wall of the spring tube 41. The bolts 50 are locked with jam nuts 51. By loosening the bolts 50 the spring tube 41 can be rotated to vary the position of the upper stop 47 with respect to the bracket 19 and then locked by tightening the bolts 50 and jam nuts 51, and thus adjust the upper limit of movement of the spring arms 21, 22. Threaded holes can be provided in the wall of the bracket tube 43 at a number of locations to allow the position of the lower stop 49 to be adjusted as well.

Figure 9:
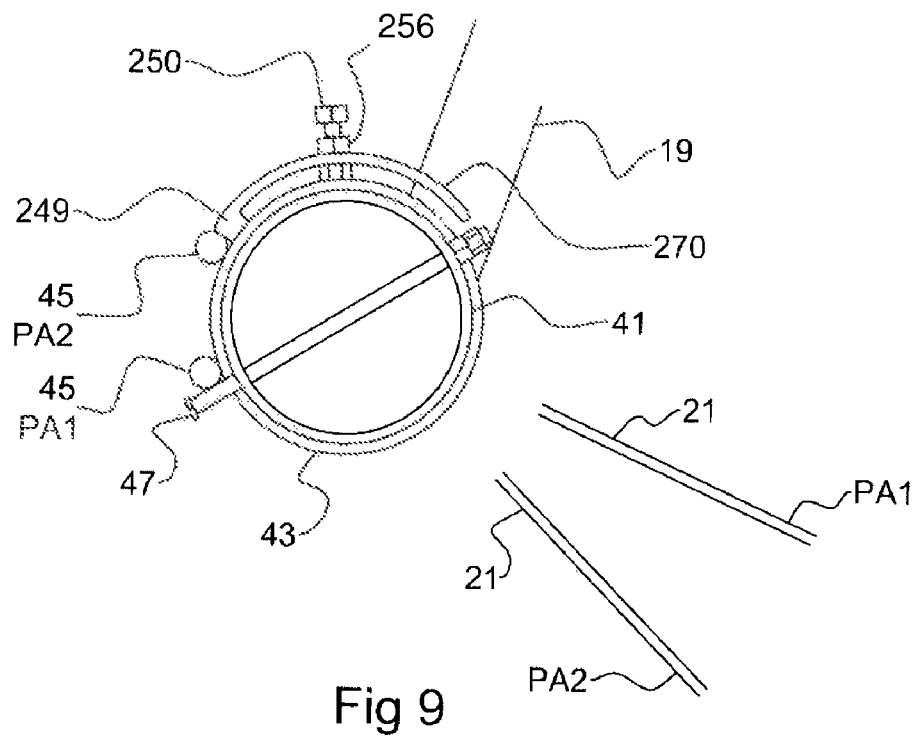
FIG. 9 is a schematic side view showing an alternate lower stop comprising a slotted gauge member.
Figure 10:
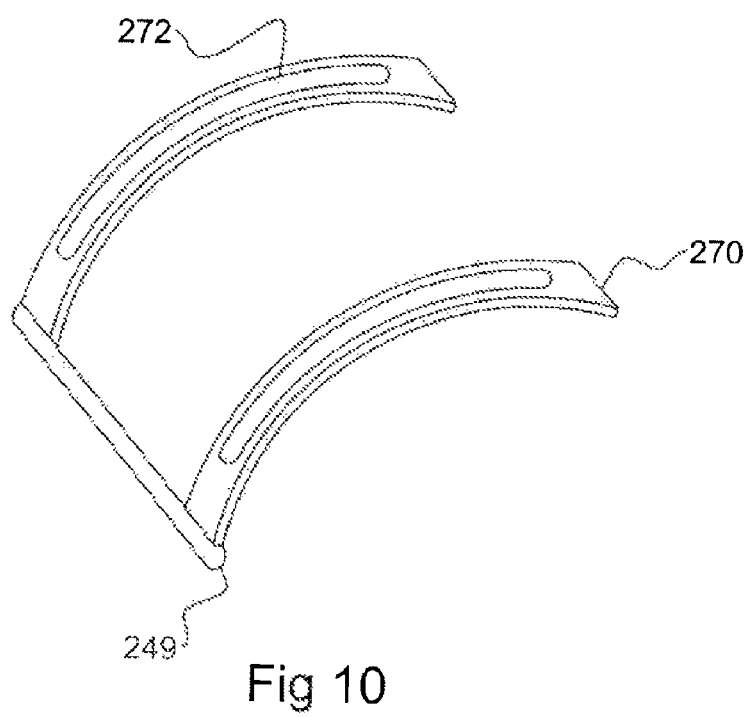
FIG. 10 is a perspective view of the slotted gauge member of the embodiment of FIG. 9.

Alternatively as illustrated in FIG. 9 a slotted gauge member 270 could be attached by the bolts 250. The gauge member 270 is shown in FIG. 10. The gauge member 270 can be moved on the bolts 250 along the slots 272. The bolts 250 are tightened as before to lock the spring tube 41 with respect to the bracket tube 43, and then the nut 256 is tightened to secure the gauge member 270 so that the lower stop 249 at the end of the gauge member 270 is in the desired position so that the cross member 45 would bear against the lower stop 249 at the desired lower limit of the neutral vertical range. The bracket 19 and upper stop 47 are as in FIG. 8. The cross member 45 and spring arm 21 are illustrated at upper and lower positions PA1, PA2 as in FIG. 8 as well.

If it is desired to conduct a field operation without the discs 27, 28 engaging the soil, that can be readily accomplished by loosening the bolt 50 and raising them out of the way. The arms 21, 22 could be chained up to the bracket 19, or the lower stop 49, such as with gauge member 270 in FIG. 9, could be adjusted so that when the arms 21, 22 are at the lower limit of the neutral vertical range N the discs 27, 28 are above the ground in a non-operating position.

Figure 11:
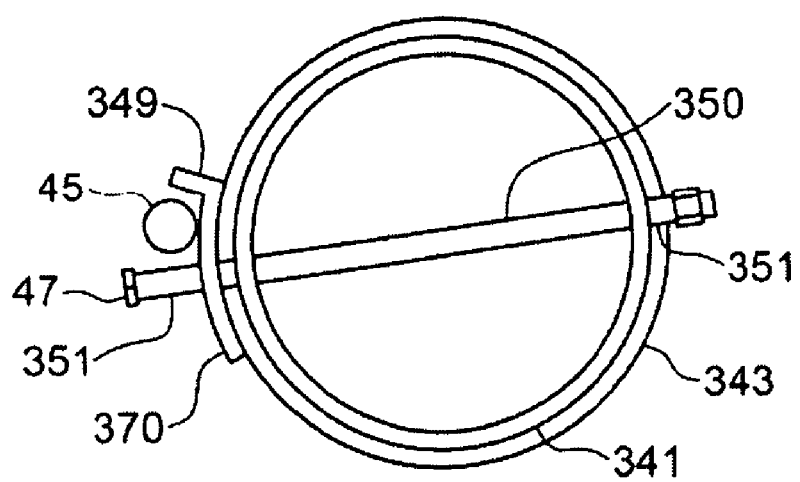
FIG. 11 is a schematic side view showing an alternate stop apparatus and gauge member.

A further alternative mount is illustrated in FIG. 11. The spring coil has been deleted so that the relationship between the cross member 45 and stops 47, 49 can be illustrated. The spring arm is prevented from upward free movement by the cross member 45 bearing against the upper stop 47. The spring arm is prevented from downward free movement by the cross member 45 bearing against the lower stop 349. When the implement is raised for transport, the lower stop 349 prevents the spring arms from falling and maintains the discs in a raised position so the implement can be transported with the discs above the ground.

Between the upper and lower stops 47, 349 the cross member 45 moves freely and so no bias force is exerted on the spring arms by the coil springs. In the illustrated embodiment of FIG. 11, the range of up and down movement of the cross member 45 is quite small, essentially being a loose fit of the cross member 45 between the stops 47, 349.

Figure 12:
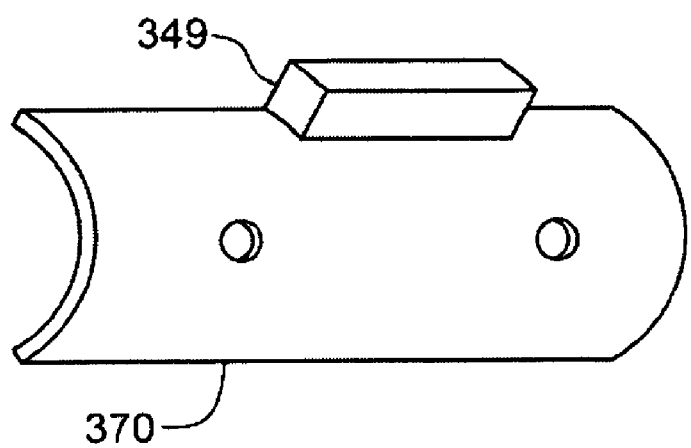
FIG. 12 is a perspective view of the gauge member of FIG. 11.
Figure 13:
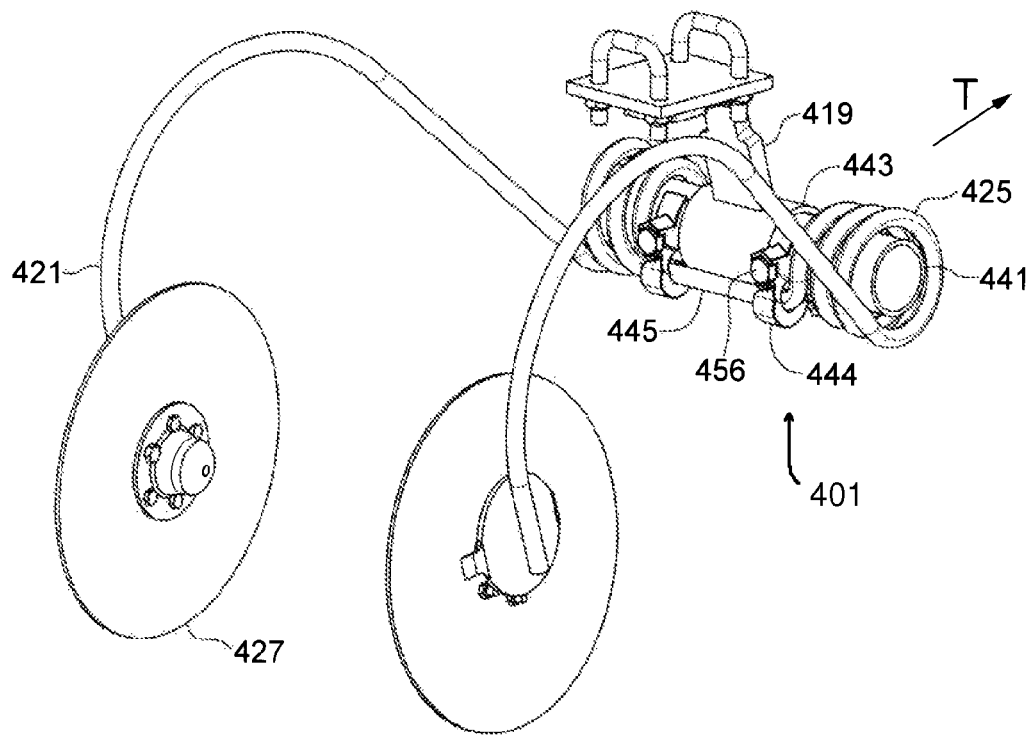
FIG. 13 is a rear perspective view of an alternate embodiment of a furrow closer apparatus of the present invention for attachment to a shank of a ground working implement where the spring arms are loosely attached by clips.
Figure 14:
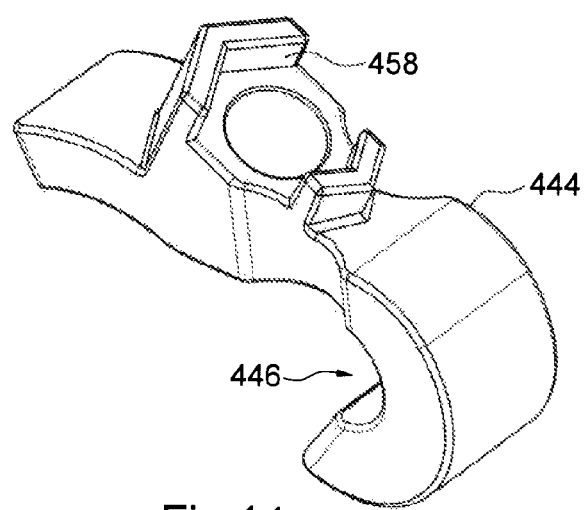
FIG. 14 is a perspective view of a clip used in the embodiment of FIG. 13.
Figure 15:
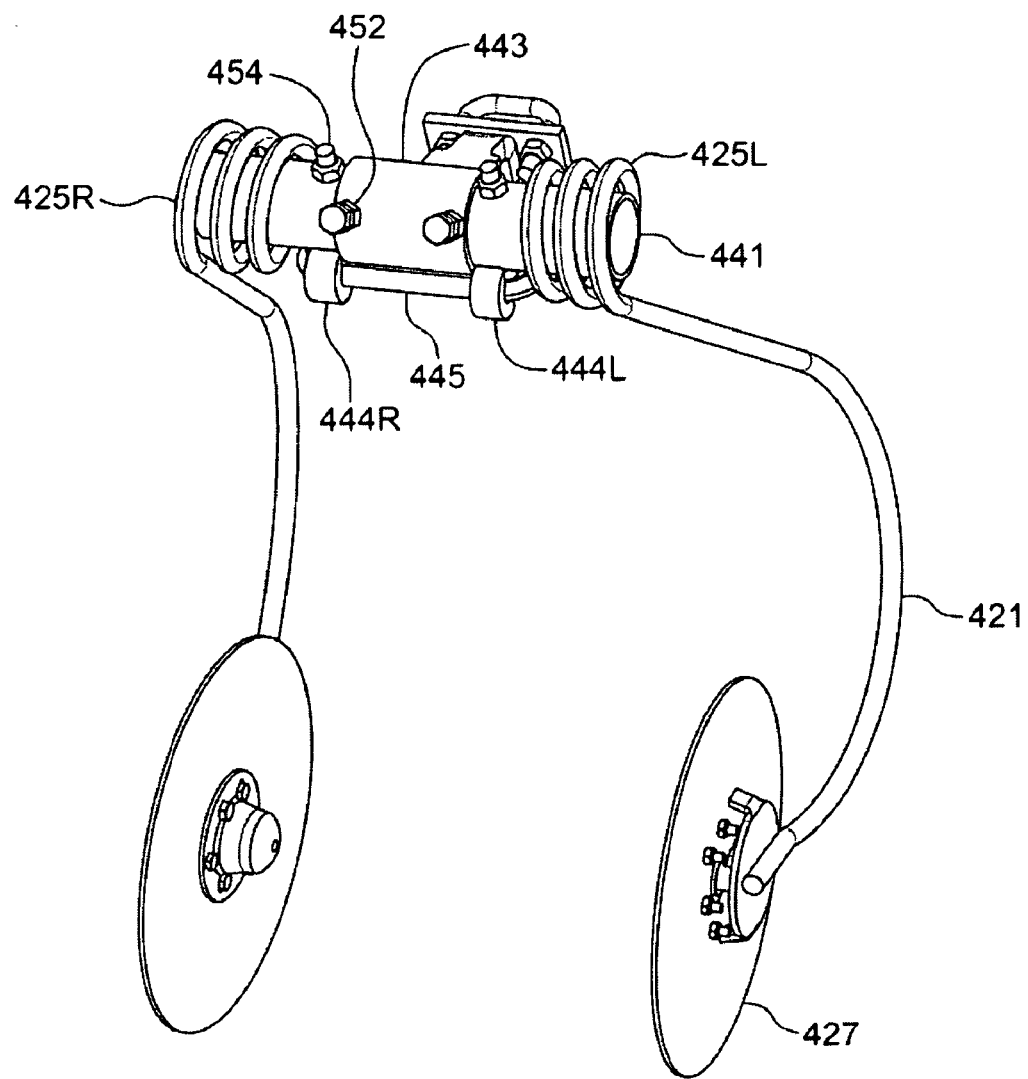
FIG. 15 is a front perspective view of the embodiment of FIG. 13.

In the illustrated embodiment of FIG. 11 a gauge member 370 is attached by the bolt 350 through the spring tube 341 and spacers 351. The gauge member 370 is shown in FIG. 12. The gauge member 370 is clamped against the bracket tube 343 by bolt 350 in the desired position.

As illustrated in FIG. 3 a flexible tether 35 is attached at one end to one spring arm 21 and at the opposite end to the other spring arm 22 such that outward movement of one spring arm 21, 22 away from the shank 3 will cause the tether 35 to exert an inward force on the other spring arm toward the shank 3. When engaged in the soil, the orientation of the discs 27, 28 causes the soil to exert a force on each disc away from the shank 3, however by tying the spring arms 21, 22 together with the tether 35, these forces are resisted and the discs are maintained in the preferred location relative to the shank 3 so that soil moved by the discs 27, 28 will land on top of the furrow 9 to close the furrow and level the soil. The flexible tether 35 does allow the spring arms 21, 22 to move freely toward each other, exerting a force only when the arms try to move apart. The tether 35 is illustrated as a chain, which is simple and economical and will not stretch. It is contemplated that in some applications it may be desired to provide a tether 35 that has some degree of resilience, such that a shock to one disc, such as by hitting a stone which forces it outwards, will not subject the other disc to the same degree of shock.

Typically during operation the spring arms 21, 22 are oriented in the neutral vertical range N when the ground engaging tool 5 is engaged with the ground and creating a furrow 9 on substantially level ground. While the discs 27, 28 are relatively light, their weight, combined with their ground engaging angled orientation, will cause them to engage sufficient soil to cover the furrow 9 and level the ground. Care must be taken that the discs 27, 28 do not move excessive soil, creating their own disc furrows on each side of the furrow 9. The discs 27, 28 can be oriented so that they barely touch the ground as well, so that they essentially just catch soil that is thrown up and to the side by the ground engaging tool 5, and deflect it back over the furrow 9.

With the arms 21, 22 in the neutral position during operation, there is no downward bias force exerted during normal operations, but when an obstruction such as a rock or lump of soil is encountered, the disc 27 or 28 will begin to rise and will be met by a resisting bias force once the arm 21 or 22 moves out of the neutral position or neutral vertical range N. If the upward force exerted by the obstruction is greater than the bias force the arm will continue to rise against the bias force, but once past the obstruction the arm will be forced down back into the neutral position. The bias force thus prevents the discs 27, 28 from flying up when an obstruction is encountered, and quickly returns the discs to the desired operating position.

Figure 5:
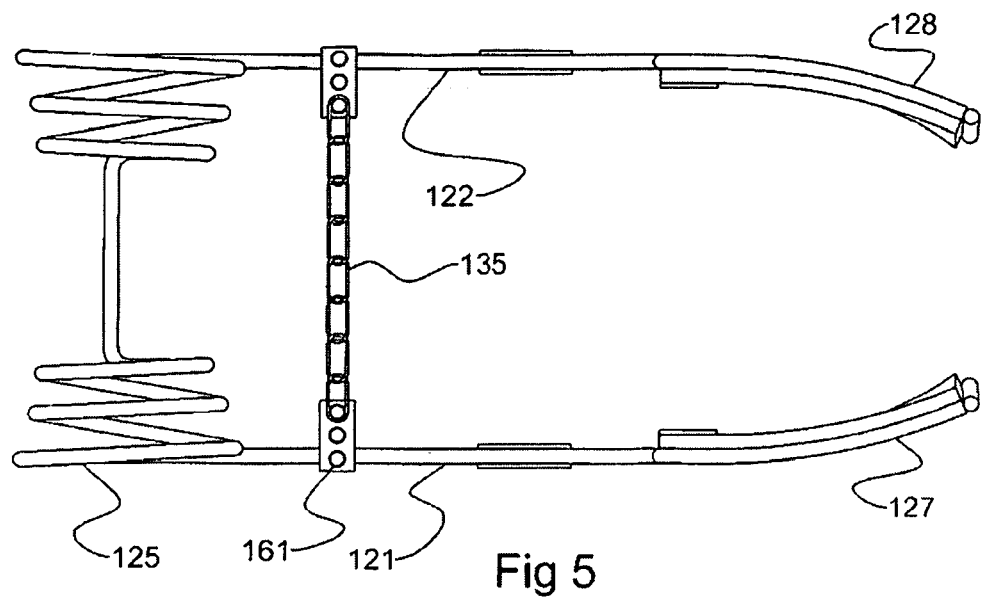
FIG. 5 is a top view of an alternate apparatus using deflector plates as soil moving elements.
Figure 6:
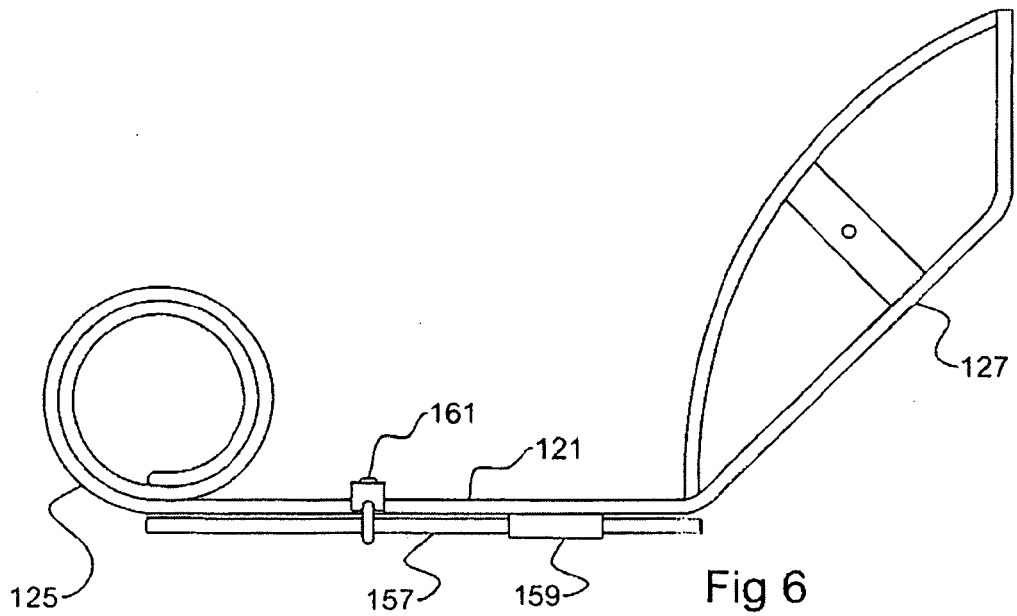
FIG. 6 is a side view of the alternate apparatus of FIG. 5.

FIGS. 5 and 6 illustrate an alternate embodiment of the furrow closer of the invention wherein the first and second soil moving elements comprise first and second deflector plates 127, 128 fixed to the lower ends of the respective first and second spring arms 121, 122. This embodiment is otherwise similar to the embodiment of FIGS. 1-4 mounted on coil springs 125 and including a tether 135 to prevent outward movement of one arm with respect to the other. The illustrated deflector plates 127, 128 are curved to smoothly direct soil over the furrow. In certain conditions, such as in dry soil, such non-rotating soil moving elements can provide satisfactory service.

A wear bar 157 is also shown. The wear bar 157 is fastened to the spring arm 121 by passing same through a socket 159 attached to the arm 121 and clamping to the arm 121 with the same clamp 161 that attaches the tether 135. The end of the wear bar 157 projects somewhat lower than the deflector plate 127 and engages the soil to raise the deflector plate 127 somewhat to control the amount of soil deflected. As the wear bar 157 wears, the clamp 161 can be loosened to move it out.

FIGS. 13-16 illustrate an alternate furrow closer apparatus 401 for attachment to a shank of a ground working implement, the shank extending rearward and downward from an implement frame member to a lower shank end adapted for attachment to a ground engaging tool as illustrated in FIG. 1. The apparatus 401 comprises a bracket 419 adapted for attachment to the shank by clamps 402 such that the bracket 419 extends down from an upper forward portion of the shank in the same manner as is illustrated in FIG. 1.

A bracket aperture 442 is defined by a lower end of the bracket 419. The bracket aperture 442 is oriented substantially horizontally and perpendicular to an operating travel direction T of the implement. In the illustrated apparatus 401 the bracket aperture 442 is provided by a bracket tube 443 welded to the bracket 419.

Right and left spring arms 421 are attached at top ends thereof to right and left coil springs 425, and the right and left coil springs 425 are connected by a cross member 445. As described above the spring arms 421, coil springs 425, and cross member 425 can be conveniently provided by a conventional paired tine harrow such as are readily economically available. Right and left soil moving elements, illustrated as discs 427, are rotatably attached to lower ends of the respective right and left spring arms 421.

A spring tube 441 extends through the coil springs 425 and through the bracket aperture 442 to attach the spring arms 421 to the bracket 419 such that a spring arm 421 extends rearward and downward from the lower end of the bracket 419 on each side of a shank location as in the same manner as described above.

Figure 16:
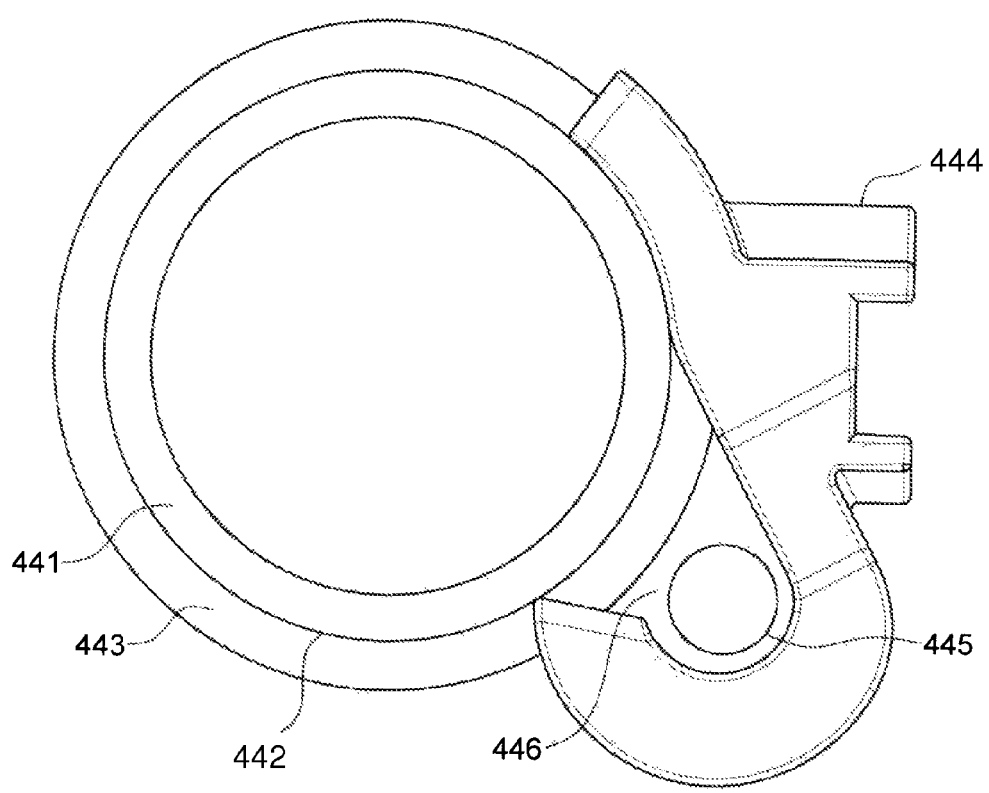
FIG. 16 is a schematic side view of the spring tube in the bracket tube, and the attachment of the clip to the spring tube adjacent to the end of the bracket tube.

In the illustrated apparatus 401, the cross member 445 is attached to the bracket 419 by right and left clips 444 attached to the spring tube 441 on corresponding right and left sides of the bracket aperture 442 such that the right and left clips 444 define right and left clip apertures 446. The cross member 445 extends through the right and left clip apertures 446. The clip apertures 446 are slightly larger than the cross member 445 such that the cross member 445 fits loosely and is movable in the clip apertures 446. This loose fit provides the up and down neutral range discussed above with respect to the prior embodiments, and also allows the spring arms 421 and coils 425 to vibrate freely, reducing the occurrence of parts, such as the bolts fastening the disc to the apparatus, becoming loose. The clips 444 can be tightened firmly to the spring tube 441 and the cross member 445 will be held loosely, as seen in FIG. 16.

The apparatus 401 also comprises a releasable lock 452 operative to lock the spring tube 441 to the bracket tube 443 to selectively allow or prevent rotation of the spring tube 441 in the bracket tube 443 to adjust the angle of the spring arms 421. Conveniently the lock 452 is provided by a bolt engaging threads in the bracket tube 443 such that rotating the bolt causes an end of the bolt to bear against the spring tube 441. A jam nut on the bolt secures the bolt against unintentional release.

The cross member 445 extends along an outer surface of the bracket tube 443 from the right coil spring 425R to the left coil spring 425L. Right and left clips 444R, 444L are located adjacent to right and left ends of the bracket tube 443 to prevent lateral movement of the spring tube 441 in the bracket tube 443.

The clips 444 are attached to the spring tube by bolts 454 extending through the spring tube. The heads 456 of the bolts 454 are engaged in recesses 458 defined by the clips 44 such that the bolts 454 are prevented from turning with respect to the clips 444 to facilitate installation and removal of nuts from the bolts 454.

A flexible tether such as described above can also be attached between the right and left spring arms.

Figure 18:
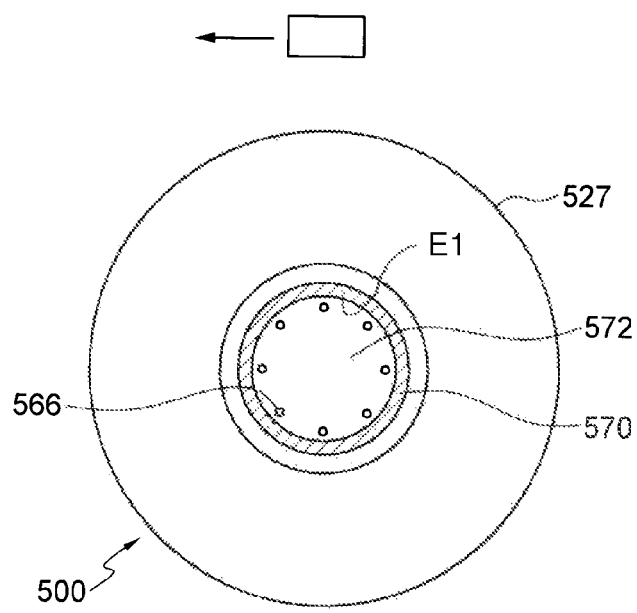
FIG. 18 is a schematic side view of the disc of the apparatus of FIG. 17 with a ring placed over the bolts holding the disc.
Figure 19:
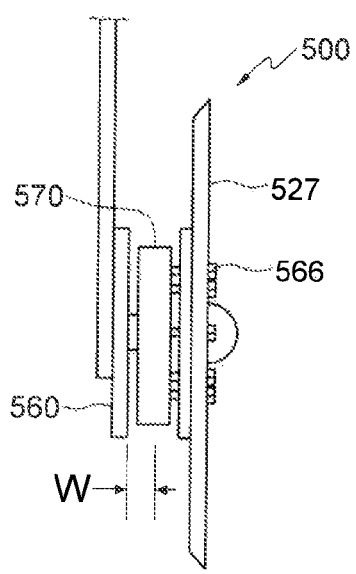
FIG. 19 is a schematic rear view of the apparatus of FIG. 17 with the ring in position.

On farms where cattle are fed on fields, baler twine is often present on land being worked by air seeders and the like. When using ground engaging rotating discs such as in the furrow closing apparatus described above, such twine commonly wraps around the shaft connecting the discs to the implement. A twine inhibiting rotating disc apparatus 500 is illustrated in FIGS. 18 and 19. The apparatus 500 is suited for use on the furrow closer described above, but could be adapted for use on any ground working implement.

Figure 17:
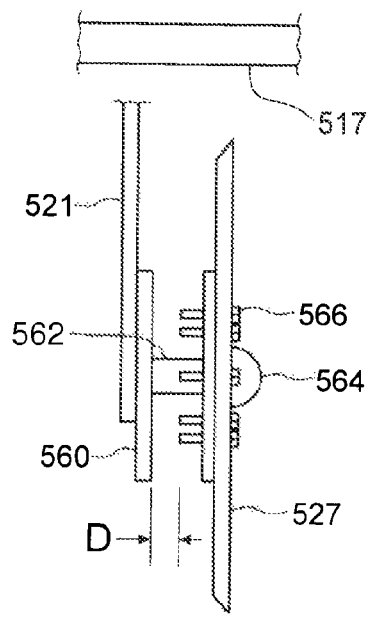
FIG. 17 is a schematic rear view of a spring arm and ground engaging disc apparatus.

A spring arm and ground engaging disc is illustrated in FIG. 17. comprising an arm 521 adapted for attachment to an implement 517 at an upper portion thereof. A mounting plate 560 is fixed to a lower portion of the arm 521 and a shaft 562 extends perpendicular to a surface of the mounting plate 560. A hub 564 is rotatably attached to the shaft 562 and a disc 527 is attached to the hub 564 by a substantially circular pattern of bolts 566. The bolts 566 extend through the disc 527 and hub 564 and then toward the mounting plate 560, substantially parallel to the shaft 562. As the disc 527 and bolts 566 rotate, twine often catches on the bolts 566 and wraps around the shaft 562.

FIGS. 18 and 19 illustrate the apparatus 500 of the invention comprising such a disc arrangement where a ring 570 is positioned between the disc 527 and the mounting plate 560. The ring 570 defining a ring aperture 572 having a diameter larger than an outside diameter of the circular pattern of bolts 566, as shown in FIG. 18, such that the bolts 566 extend into the ring aperture 572 and such that the ring 570 rotates around the circular pattern of bolts 566. As seen in FIG. 19, the ring 570 has a width W greater than a distance D from inner ends of the bolts 566 to the mounting plate 560, as shown in FIG. 17, such that the ring 570 is prevented from passing between the ends of the bolts 566 and the mounting plate 560.

The ring 570 has a width W configured such that an inner edge E1 of the ring 570 is adjacent to the surface of the mounting plate 560, and an outer edge of the ring is adjacent to the disc, and such that the ring can rotate freely between the surface of the mounting plate and the disc As the disc 527 is engaged in the ground and rotating during operation, the ring 570 rotates freely on the bolts 566 and reduces the occurrence of twine contacting the bolts 566 and then wrapping around the shaft 562. It is contemplated that the ring 570 would conveniently be made from a light weight plastic material. The arrangement is also typical of known ground engaging discs in other farm implements, and it is contemplated the ring 570 could have similar benefits in these as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A ground working implement comprising:
   an implement frame adapted for movement along the ground in an operating travel direction;
   a curved shank extending rearward and then downward from an implement frame member to a lower shank end;
   a ground engaging tool attached to the lower shank end and operative to create a furrow in the soil when the implement is moved along the ground;
   a bracket attached to the implement such that the bracket extends down from an upper forward portion of the shank;
   a bracket aperture defined by a lower end of the bracket, the bracket aperture oriented substantially horizontally and perpendicular to the operating travel direction;
   right and left spring arms attached at top ends thereof to right and left coil springs, the right and left coil springs connected by a cross member;
   right and left soil moving elements attached to lower ends of the respective right and left spring arms;
   a spring tube extending through the coil springs and through the bracket aperture to attach the spring arms to the bracket such that a spring arm extends rearward and downward from the lower end of the bracket on each side of a shank location;
   right and left clips attached to the spring tube on corresponding right and left sides of the bracket aperture such that the right and left clips define right and left clip apertures, and wherein the cross member extends through the right and left clip apertures; and
   wherein the clip apertures are larger than the cross member such that the cross member is movable in the clip apertures.

2. The ground working implement of claim 1 comprising a bracket tube defining the bracket aperture, and a releasable lock operative to lock the spring tube to the bracket tube to selectively allow or prevent rotation of the spring tube in the bracket tube.

3. The ground working implement of claim 2 wherein the lock is provided by a bolt engaging threads in the bracket tube such that rotating the bolt causes an end of the bolt to bear against the spring tube.

4. The ground working implement of claim 2 wherein the cross member extends along an outer surface of the bracket tube from the right coil spring to the left coil spring.

5. The ground working implement of claim 1 wherein the clips are located adjacent to right and left ends of the bracket aperture.

6. The ground working implement of claim 1 wherein the clips are attached to the spring tube by bolts extending through the spring tube.

7. The ground working implement of claim 6 wherein heads of the bolts are engaged in recesses defined by the clips such that the bolts are prevented from turning with respect to the clips.

8. The ground working implement of claim 1 further comprising a flexible tether attached at one end to the right spring arm and at the opposite end to the left spring arm such that outward movement of one spring arm away from the shank location will cause the tether to exert an inward force on the other spring arm toward the shank location.

9. The ground working implement of claim 1 wherein the spring arms, coil springs, and cross member are provided by a conventional paired tine harrow.

10. A furrow closer apparatus for attachment to a shank of a ground working implement, the shank extending rearward and downward from an implement frame member to a lower shank end adapted for attachment to a ground engaging tool, the apparatus comprising:

a bracket adapted for attachment to the implement such that the bracket extends down from an upper forward portion of the shank;

a bracket aperture defined by a lower end of the bracket, the bracket aperture oriented substantially horizontally and perpendicular to an operating travel direction of the implement;

right and left spring arms attached at top ends thereof to right and left coil springs, the right and left coil springs connected by a cross member;

right and left soil moving elements attached to lower ends of the respective right and left spring arms;

a spring tube extending through the coil springs and through the bracket aperture to attach the spring arms to the bracket such that a spring arm extends rearward and downward from the lower end of the bracket on each side of a shank location;

right and left clips attached to the spring tube on corresponding right and left sides of the bracket aperture such that the right and left clips define right and left clip apertures, and wherein the cross member extends through the right and left clip apertures; and wherein the clip apertures are larger than the cross member such that the cross member is movable in the clip apertures.

11. The apparatus of claim 10 comprising a bracket tube defining the bracket aperture, and a releasable lock operative to lock the spring tube to the bracket tube to selectively allow or prevent rotation of the spring tube in the bracket tube.

12. The apparatus of claim 11 wherein the lock is provided by a bolt engaging threads in the bracket tube such that rotating the bolt causes an end of the bolt to bear against the spring tube.

13. The apparatus of claim 11 wherein the cross member extends along an outer surface of the bracket tube from the right coil spring to the left coil spring.

14. The apparatus of claim 10 wherein the clips are located adjacent to right and left ends of the bracket aperture.

15. The apparatus of claim 10 wherein the clips are attached to the spring tube by bolts extending through the spring tube.

16. The apparatus of claim 15 wherein heads of the bolts are engaged in recesses defined by the clips such that the bolts are prevented from turning with respect to the clips.

17. The apparatus of claim 10 further comprising a flexible tether attached at one end to the right spring arm and at the opposite end to the left spring arm such that outward movement of one spring arm away from the shank location will cause the tether to exert an inward force on the other spring arm toward the shank location.

18. The apparatus of claim 10 wherein the spring arms, coil springs, and cross member are provided by a conventional paired tine harrow.

* * * * *